(12) United States Patent
Pesch et al.

(10) Patent No.: US 9,108,666 B2
(45) Date of Patent: Aug. 18, 2015

(54) STEERING SYSTEM IN A VEHICLE

(75) Inventors: Michael Pesch, Schwieberdingen (DE);
Hussam Helmi, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/125,113

(22) PCT Filed: Apr. 26, 2012

(86) PCT No.: PCT/EP2012/057599
§ 371 (c)(1),
(2), (4) Date: Jan. 7, 2014

(87) PCT Pub. No.: WO2012/167998
PCT Pub. Date: Dec. 13, 2012

(65) Prior Publication Data
US 2014/0131132 A1 May 15, 2014

(30) Foreign Application Priority Data

Jun. 10, 2011 (DE) .......................... 10 2011 051 003
Oct. 14, 2011 (DE) .......................... 10 2011 084 510

(51) Int. Cl.
*B62D 5/04* (2006.01)
*F16H 55/24* (2006.01)
*F16H 57/022* (2012.01)

(52) U.S. Cl.
CPC .............. *B62D 5/0409* (2013.01); *F16H 55/24* (2013.01); *F16H 2057/0224* (2013.01)

(58) Field of Classification Search
CPC ............... B62D 5/0403; B62D 5/0409; F16H 2057/0224

USPC .................................................. 180/444, 443
See application file for complete search history.

(56) References Cited

U.S. PATENT DOCUMENTS

| 3,888,134 | A | * | 6/1975 | Miranda | 74/405 |
| 6,076,628 | A | * | 6/2000 | Pattok et al. | 180/444 |
| 6,155,376 | A | * | 12/2000 | Cheng | 180/444 |
| 6,164,407 | A | * | 12/2000 | Cheng | 180/444 |
| 6,357,313 | B1 | * | 3/2002 | Appleyard | 74/388 PS |

(Continued)

FOREIGN PATENT DOCUMENTS

| DE | 19703903 | 8/1998 |
| DE | 102007019324 | 11/2007 |

(Continued)

OTHER PUBLICATIONS

International Search Report for Application No. PCT/EP2012/057599 dated Jul. 26, 2012 (3 pages, English Translation).

*Primary Examiner* — Joseph Rocca
*Assistant Examiner* — Michael Stabley
(74) *Attorney, Agent, or Firm* — Michael Best & Friedrich LLP

(57) ABSTRACT

The invention relates to a steering system in a vehicle, comprising a steering shaft (3) for transmitting a steering angle predetermined by the driver and an electric servomotor (7) for producing a supporting driving torque, wherein the servomotor (7) is coupled to the steering shaft (3). The steering shaft (3) and the servomotor (7) are accommodated in a common bearing housing (8), wherein the steering shaft (3) and/or the motor shaft (15) of the servomotor (7) are accommodated in at least one adjustable eccentric bearing (30, 31).

5 Claims, 5 Drawing Sheets

(56) References Cited

U.S. PATENT DOCUMENTS

| | | | |
|---|---|---|---|
| 6,398,400 B1 * | 6/2002 | Nienhaus | 384/255 |
| 8,307,938 B2 * | 11/2012 | Tokura et al. | 180/443 |
| 2007/0295552 A1 * | 12/2007 | Watanabe et al. | 180/444 |

FOREIGN PATENT DOCUMENTS

| | | |
|---|---|---|
| DE | 102010002569 | 9/2010 |
| EP | 0860346 | 8/1998 |
| EP | 1065132 | 1/2001 |
| JP | H07237551 | 9/1995 |
| JP | 10002384 | 1/1998 |
| JP | 11034888 | 2/1999 |
| JP | 2003063421 | 3/2003 |
| JP | 2004304877 | 10/2004 |
| JP | 2007530333 | 11/2007 |
| JP | 2008044426 | 2/2008 |

* cited by examiner

STEERING SYSTEM IN A VEHICLE

BACKGROUND OF THE INVENTION

The invention relates to a steering system in a vehicle.

Vehicle steering systems which have a steering shaft which is actuable via the steering wheel and is coupled to a toothed rack, via which the steerable wheels are adjustable by a desired wheel steering angle are known, for example from DE 197 03 903 A1. An electric servomotor which acts directly on the steering shaft and applies an assisting servo torque thereto is provided for assisting the steering power.

During the assembly, care should be taken to ensure a high degree of accuracy in the aligning of the longitudinal axis of the electric servomotor with respect to the steering shaft axis so that a play-free kinematic coupling between the rotor shaft of the electric servomotor and the steering shaft is ensured. This is a prerequisite for a high degree of efficiency and a long service life.

SUMMARY OF THE INVENTION

The invention is based on the object of designing a steering system in a vehicle in such a manner that with compact dimensions, in particular in the region of the steering power assistance, a high degree of efficiency and a long service life are provided.

The steering system according to the invention is used in vehicles in order to convert the steering angle predetermined by the driver into a wheel steering angle of the steerable wheels. The steering system comprises a steering spindle or steering shaft via which a steering angle is predetermined by actuation of the steering wheel. Furthermore, the steering system comprises a steering linkage with a toothed rack which is coupled kinematically to the steering shaft and via which the steerable wheels are adjusted by a desired wheel steering angle. In addition, the steering system is assigned an electric servomotor for producing an assisting driving torque, said servomotor being coupled to the steering shaft. When the servomotor is actuated, the rotational movement of the steering shaft is assisted by an additional torque.

The steering shaft and the motor shaft of the servomotor are accommodated in a common bearing housing, which permits a compact design in the region of the steering power assistance. The steering shaft and the motor shaft of the servomotor are in particular at an angle to each other, for example at least approximately at a 90° angle, and are arranged offset with respect to each other. The kinematic coupling between the motor shaft of the servomotor and the steering shaft takes place via gearing components which are preferably designed as a worm and a worm wheel, wherein the worm can be formed integrally with the motor shaft of the servomotor and the worm wheel is coupled to the steering shaft for rotation therewith.

In order to be able to compensate for play in the kinematic transmission linkage between the motor shaft of the servomotor and the steering shaft, at least one of the shafts—the steering shaft and/or the motor shaft of the servomotor—is accommodated in an adjustable eccentric bearing in the bearing housing. The position of the shaft is adjustable radially with respect to the longitudinal axis thereof via the eccentric bearing. This design permits the shafts to be mounted in the bearing housing and subsequently compensation of play to be carried out via the eccentric bearing. In particular in the embodiment in which the worm is formed integrally with the motor shaft of the servomotor and, after installation in the bearing housing, is accommodated fixedly in the radial direction in individual bearings without the possibility of retrospective adjustment, the distance between steering shaft and motor shaft can be adjusted to a desired extent via the mounting of the steering shaft in an eccentric bearing. In this connection, the motor shaft is expediently accommodated rotatably in the bearing housing via just two individual bearings, wherein the individual bearings are located, for example, on the motor shaft axially on opposite sides of the worm. The individual bearing remote from the stator is advantageously designed here as a fixed bearing and the bearing facing the stator is designed as a movable bearing.

The steering shaft is preferably accommodated adjustably in the bearing housing in at least one eccentric bearing, whereas the motor shaft is accommodated in the bearing housing without an adjustment option of this type. In principle, however, embodiments in which only the motor shaft is mounted via at least one eccentric bearing, whereas the steering shaft is accommodated without eccentric bearings of this type, or embodiments in which both the steering shaft and the motor shaft are accommodated adjustably in the bearing housing via in each case at least one eccentric bearing, are also possible.

According to an expedient embodiment, at least one of the shafts is accommodated in two axially mutually spaced-apart eccentric bearings in the bearing housing. The two eccentric bearings are advantageously located in this case axially on different sides of a gearing member, which is part of the kinematic transmission linkage between the electric servomotor and the steering shaft. In an embodiment of the kinematic transmission with the aid of a worm and a worm wheel and mounting of the steering shaft in two eccentric bearings, the latter are preferably located on different sides of the worm wheel, which is fixedly coupled to the steering shaft. In this connection, it may be expedient for at least one eccentric bearing, optionally for the two eccentric bearings, to in each case be directly adjacent to an end side of the gearing member, i.e., in the embodiment of the gearing member as a worm wheel, to be in contact with the respective end side of the worm wheel.

In the case of two axially mutually spaced-apart eccentric bearings on a shaft, the eccentric bearings provide two independent adjustment possibilities or degrees of freedom. In order to avoid a spatial tilting of the shaft in the bearing housing and to displace the shaft, with respect to an ideal position, only radially with respect to the longitudinal axis of the shaft, expediently, in a joint assembly step, the two eccentric bearings are simultaneously adjusted, and therefore the shaft is adjusted in an axially parallel manner in the radial direction. Depending on the direction of adjustment, it is possible to move the gearing members, the play between which is intended to be adjusted, away from or closer to each other.

The eccentric bearing expediently comprises an eccentric sleeve, which is mounted rotatably in the bearing housing. An individual bearing in which the shaft is mounted is accommodated in the eccentric sleeve. The shaft axis can be adjusted in the radial direction by rotation of the eccentric sleeve in relation to the bearing housing.

According to a further advantageous embodiment, the eccentric sleeve can be fixed in the bearing housing via a locking member. After the desired bearing play has been adjusted by actuation of the eccentric sleeve, the eccentric sleeve is fastened in the bearing housing via the locking member such that the relative position between the gearing members is also permanently fixed.

BRIEF DESCRIPTION OF THE DRAWINGS

Further advantages and expedient embodiments can be gathered from the further claims, the description of the figures and the drawings, in which:

DETAILED DESCRIPTION

The same components are provided with the same reference numbers in the figures.

Figure 1:
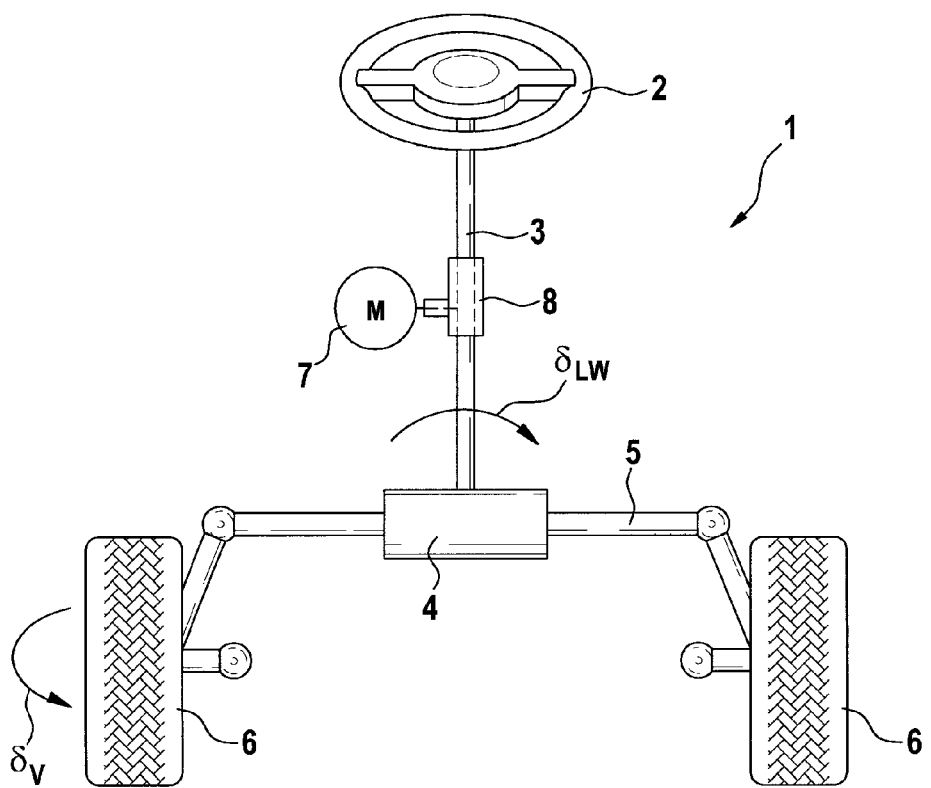
FIG. 1 shows a schematic view of a steering system in a vehicle with a servomotor assigned to the steering shaft of the steering system.

The steering system 1, which is shown in FIG. 1, in a vehicle comprises a steering wheel 2, a steering shaft 3, a steering gear 4, a steering linkage 5 with a toothed rack and steerable wheels 6. By actuation of the steering wheel 2, the driver predetermines a steering angle $\delta_{LW}$ in the steering shaft 3 which is connected to the steering wheel and, via the steering gear 4, adjusts the toothed rack of the steering linkage 5 in the transverse direction, whereupon the wheel steering angle $\delta_V$ is set at the steerable wheels.

For steering power assistance, use is made of an electric servomotor 7 which introduces an assisting driving torque into the steering shaft 3 via a gearing. The gearing comprises a worm on a shaft section of the motor shaft of the servomotor 7 and a worm wheel which is in engagement with the worm and is connected to the steering shaft 3 for rotation therewith. The steering shaft 3 and the motor shaft of the electric servomotor 7 are accommodated in a bearing housing 8 of the steering system 1.

Figure 2:
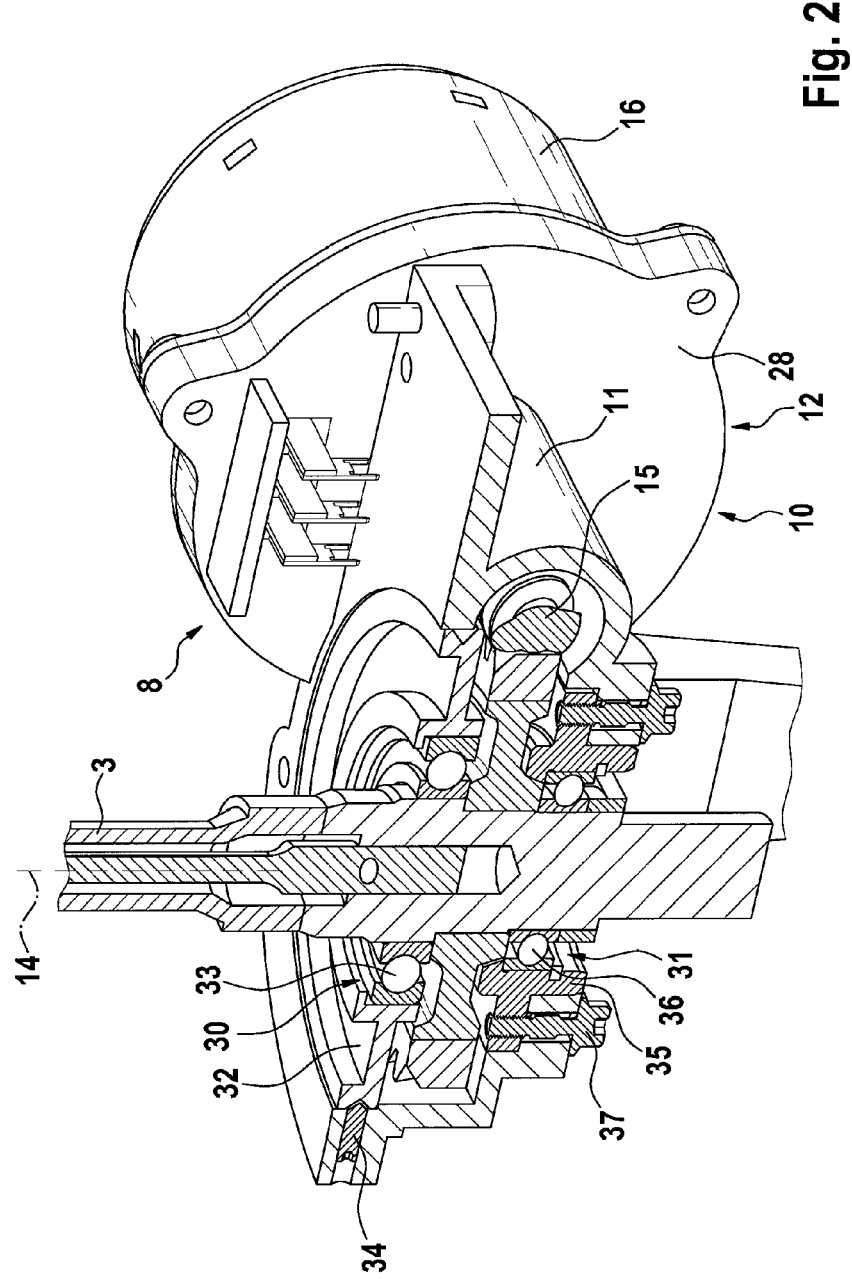
FIG. 2 shows a section longitudinally through the steering shaft in the region of a bearing housing accommodating the steering shaft and an electric servomotor, wherein the steering shaft is accommodated rotatably in the bearing housing via two eccentric bearings.
Figure 3:
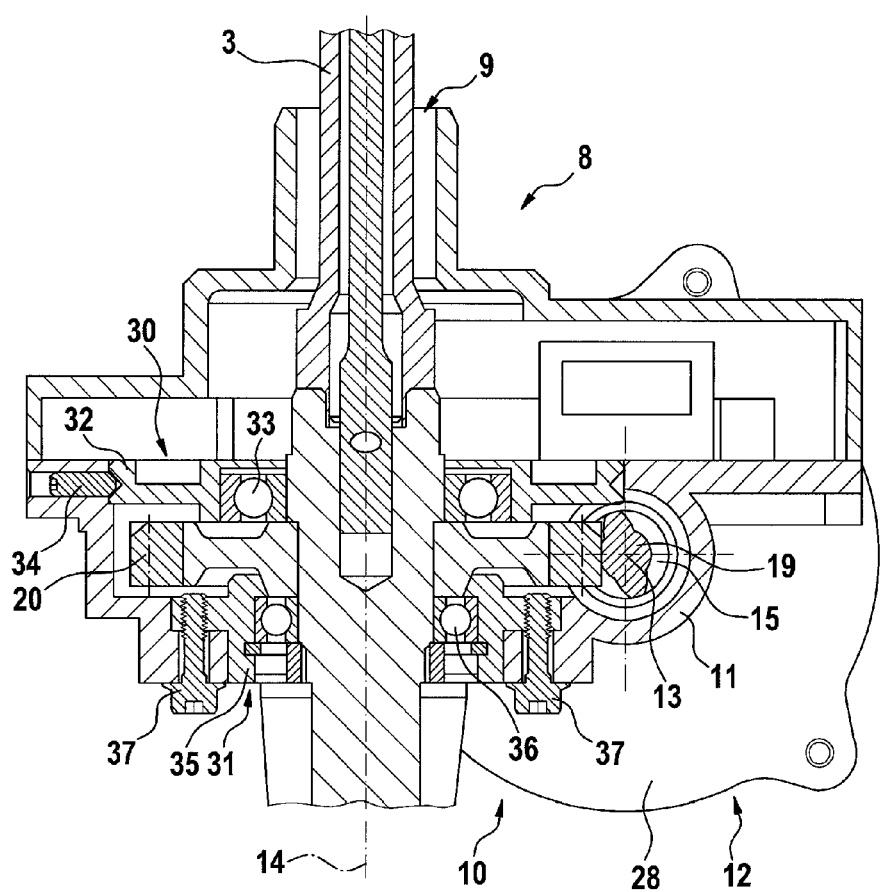
FIG. 3 shows a further step longitudinally through the steering shaft.

FIGS. 2 and 3 illustrate a first exemplary embodiment of a bearing housing 8 with an eccentric shaft 3 and servomotor accommodated therein. The bearing housing has a receiving opening 9 for the mounting of the steering shaft 3 and a motor bearing housing 10 which is formed integrally with the bearing housing 3 and comprises a motor shaft housing 11 and a stator housing 12. The motor shaft 15 of the electric servomotor is accommodated in the motor shaft housing 11. The stator housing 12 is designed as a stator flange 28 to which the stator 16 (FIG. 2) of the servomotor is fastened. The longitudinal axis 13 of the motor shaft 15 and the longitudinal axis 14 of the steering shaft 3 lie orthogonally and offset laterally with respect to each other.

The driving torque produced by the electric servomotor is transmitted via a worm 19, which is formed integrally with the motor shaft 15, to a worm wheel 20, which is coupled to the steering shaft 3 for rotation therewith. The motor shaft 15 is mounted on two individual bearings in the motor shaft housing 11, wherein the two individual bearings fix the motor shaft 15 to the motor shaft housing 11 in the radial direction. By contrast, the steering shaft 3 is accommodated in the bearing housing 8 in two eccentric bearings 30 and 31 via which the position of the steering shaft 3 in the bearing housing is adjustable. In the case where two eccentric bearings 30 and 31 are appropriately actuated, the steering shaft 3 can be displaced with respect to the longitudinal axis 14 thereof in the radial direction and parallel to a starting position. By this means, the play between the worm 19 and the worm wheel 20 can be adjusted.

The two eccentric bearings 30 and 31 are located on opposite sides of the worm wheel 20 and are directly in contact with the respective end side of the worm wheel 20. The upper, first eccentric bearing 30 comprises an eccentric sleeve 32, which is accommodated rotatably in the bearing housing 8, and an individual bearing 33 for accommodating the steering shaft 3. The relative rotational position of the eccentric sleeve 32 in the bearing housing 8 can be fixed via a locking pin 34.

The second, lower eccentric bearing 31 is constructed analogously to the first eccentric bearing 30 and comprises an eccentric sleeve 35 which is accommodated rotatably in the bearing housing 8 and in which an individual bearing 36 for the mounting of the steering shaft 3 is accommodated. The adjusted rotational position of the eccentric sleeve 35 in the bearing housing 8 is fixable via locking pins 37.

Figure 4:
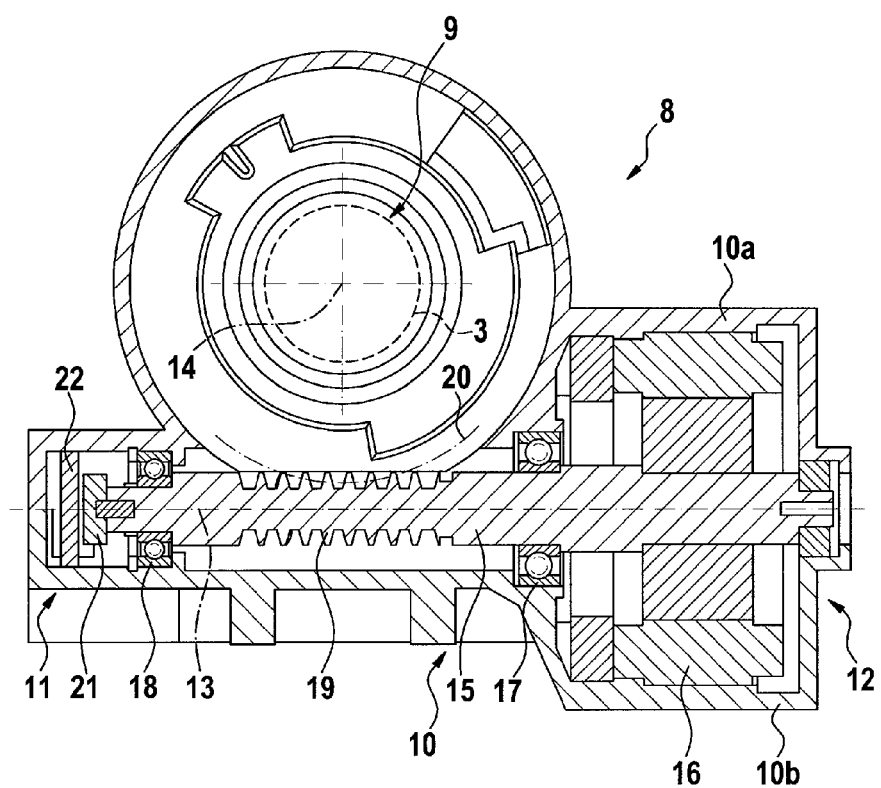
FIG. 4 shows a section through the bearing housing transversely with respect to the steering shaft with an illustration of the electric servomotor.

As can be gathered from the exemplary embodiment according to FIG. 4, the longitudinal axis 13 of the motor bearing housing 10 extends orthogonally and offset laterally with respect to the longitudinal axis 14 of the receiving opening 9 and of the steering shaft used. The motor bearing housing 10 is constructed in two parts and comprises two housing shells 10a and 10b, of which the first housing shell 10a is formed integrally with the first housing section, which forms the receiving opening 9, and the second housing shell 10b is formed separately with respect thereto and is placeable onto the first housing shell 10a. Overall, the motor bearing housing 10 is composed of a motor shaft housing 11, in which the motor shaft 15 of the servomotor 7 is accommodated, and a stator housing 12 for accommodating the stator 16 of the servomotor.

The motor shaft 15 is mounted in two housing-side individual bearings 17 and 18, of which the individual bearing 17 which is adjacent to the stator 16 and is mounted directly upstream axially from the stator is designed as a movable bearing and the individual bearing 18 remote from the stator is designed as a fixed bearing. The two individual bearings 17 and 18 lie axially on opposite sides with respect to the worm 19, which meshes with the worm wheel 20, which is illustrated by way of indication in FIG. 4 and is connected to the steering shaft 3 for rotation therewith. The individual bearing 18 is located adjacent to the free end side of the motor shaft 15. The entire shaft section which protrudes axially over the stator 16 and is also a carrier of the worm 19 is formed integrally with the motor shaft 15 or is formed by the motor shaft 15. As a result, the mounting of the motor shaft 15 in the bearing housing 8 is possible with just two individual bearings 17, 18.

As can furthermore be gathered from FIG. 4, a magnet element 21 which revolves together with the motor shaft 15 is fastened to the axially free end side of the motor shaft 15. The magnet element 21 is assigned a magnetic field sensor 22 which is mounted axially directly upstream, is positioned in a manner mounted on the housing and senses the revolving magnetic field. The magnet element 21 and the magnetic field sensor 22 together form a rotational position sensor arrangement for determining the current rotational position of the motor shaft 15. The magnetic field sensor 22 is arranged, for example, on an electronics printed circuit board, in particular on a printed circuit board having the control electronics for controlling the servomotor.

Figure 5:
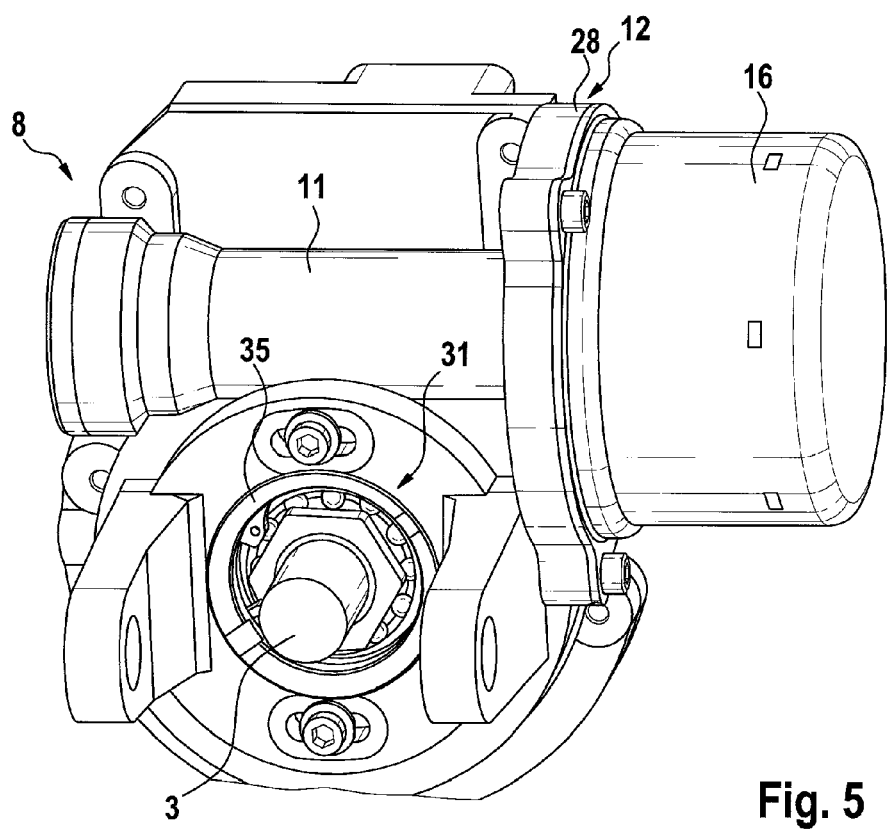
FIG. 5 shows a perspective illustration of the bearing housing.

FIG. 5 illustrates the bearing housing 8 in a view from below. The eccentricity of the eccentric sleeve 35, which is part of the second, lower eccentric bearing 31, can be seen. By rotation of the eccentric sleeve 35, the radial position of the steering shaft 3 in the bearing housing 8 is adjusted and therefore so too is the play between the worm wheel, which is connected to the steering shaft 3 for rotation therewith, and the worm on the motor shaft of the electric servomotor.

The invention claimed is:

1. A steering system in a vehicle, comprising a steering shaft (3) for transmitting a steering angle predetermined by the driver, and comprising an electric servomotor (7) for producing an assisting driving torque, said servomotor being coupled to the steering shaft (3), wherein the steering shaft (3) and a motor shaft (15) of the servomotor (7) are accommodated in a common bearing housing (8), wherein the steering shaft (3) is accommodated in two adjustable eccentric bearings (30, 31) in the bearing housing (8), and a position of the shaft (3) is adjustable radially with respect to a longitudinal axis (14) thereof via the eccentric bearings (30, 31), wherein the two eccentric bearings (30, 31) are arranged on the steering shaft axially on different sides of a worm wheel (20), wherein the worm wheel (20) is part of a kinematic transmission linkage between the servomotor (7) and the steering shaft (3) and connected to the shaft (3) for rotation therewith, and further wherein the eccentric bearings (30, 31) are in each case directly adjacent to an end side of the worm wheel (20).

2. The steering system as claimed in claim 1, characterized in that the eccentric bearing (30, 31) has an eccentric sleeve (32, 35) having an individual bearing (33, 36), wherein the individual bearing (33, 36) is accommodated eccentrically in the eccentric sleeve (32, 35), which is accommodated rotatably in the bearing housing (8).

3. The steering system as claimed in claim 2, characterized in that the eccentric sleeve (32, 35) is fixable in the bearing housing (8) via a locking member (34, 37).

4. The steering system as claimed in claim 1, characterized in that two individual bearings (17, 18) with radial fixing for the mounting of the motor shaft (15) are accommodated in the bearing housing (8).

5. The steering system as claimed in claim 1, characterized in that the bearing housing (8) has a motor shaft housing (11) for accommodating the motor shaft (15) which extends orthogonally to the steering shaft axis (14).

\* \* \* \* \*